(12) United States Patent
Park

(10) Patent No.: US 12,102,182 B2
(45) Date of Patent: Oct. 1, 2024

(54) NEGATIVE POISSON'S RATIO MATERIALS FOR WINTER SPORTS EQUIPMENT

(71) Applicant: Joon Bu Park, Huntington Beach, CA (US)

(72) Inventor: Joon Bu Park, Huntington Beach, CA (US)

(*) Notice: Subject to any disclaimer, the term of this patent is extended or adjusted under 35 U.S.C. 154(b) by 213 days.

(21) Appl. No.: 17/581,428

(22) Filed: Jan. 21, 2022

(65) Prior Publication Data

US 2023/0232935 A1 Jul. 27, 2023

(51) Int. Cl.
| | |
|---|---|
| A43B 5/04 | (2006.01) |
| A63C 5/12 | (2006.01) |
| A63C 9/086 | (2012.01) |
| A63C 10/10 | (2012.01) |
| A63C 10/12 | (2012.01) |
| B62M 27/02 | (2006.01) |

(52) U.S. Cl.
CPC ............. *A43B 5/0486* (2013.01); *A63C 5/12* (2013.01); *A63C 9/086* (2013.01); *A63C 10/10* (2013.01); *A63C 10/12* (2013.01); *B62M 27/02* (2013.01); *B62M 2027/025* (2013.01)

(58) Field of Classification Search
CPC ......... A43B 5/0486; A63C 5/12; A63C 9/086; A63C 10/10; A63C 10/12; A63C 5/126; B62M 27/02; B62M 2027/025
See application file for complete search history.

(56) References Cited

U.S. PATENT DOCUMENTS

| | | | | |
|---|---|---|---|---|
| 5,820,154 | A * | 10/1998 | Howe | A63C 9/003 |
| | | | | 280/610 |
| 5,830,535 | A * | 11/1998 | Junius | A63C 5/056 |
| | | | | 427/377 |
| 6,558,784 | B1 * | 5/2003 | Norton | A43B 5/002 |
| | | | | 36/49 |
| 7,160,621 | B2 * | 1/2007 | Chaudhari | B60R 19/18 |
| | | | | 293/122 |
| 7,598,652 | B2 * | 10/2009 | Kornbluh | B64C 3/48 |
| | | | | 310/309 |
| 10,661,304 | B2 * | 5/2020 | Roberts | B05D 1/005 |
| 10,834,987 | B1 | 11/2020 | Bottlang et al. | |
| 11,123,628 | B2 * | 9/2021 | Frappier | A63C 10/24 |

(Continued)

FOREIGN PATENT DOCUMENTS

| | | |
|---|---|---|
| EP | 1612108 | 2/2008 |
| JP | H0819634 A * | 1/1996 |

(Continued)

OTHER PUBLICATIONS en.wikipedia.org [online], "Winter sports," 2004, retrieved on Feb. 1, 2022, retrieved from URL <"https://en.wikipedia.org/wiki/Winter_sports">, 7 pages.

(Continued)

*Primary Examiner* — James A Shriver, II
*Assistant Examiner* — Michael T. Walsh
(74) *Attorney, Agent, or Firm* — Fish & Richardson P.C.

(57) ABSTRACT

A ski includes an elongated ski body having a bottom layer defining a bottom surface of the ski, a top layer defining a top surface of the ski, and a middle layer disposed between the bottom layer and the top layer, in which the middle layer includes a negative Poisson's ratio (NPR) foam material having a Poisson's ratio of between 0 and −1.

9 Claims, 12 Drawing Sheets

Granular / Powder

Porous Core Material

NPR Core Material

Final NPR Core + Cover

(56) References Cited

U.S. PATENT DOCUMENTS

| | | | | |
|---|---|---|---|---|
| 2005/0281999 A1* | 12/2005 | Hofmann | ............ | B32B 5/18 |
| | | | | 428/319.3 |
| 2005/0287371 A1* | 12/2005 | Chaudhari | ............ | B60R 19/18 |
| | | | | 428/480 |
| 2008/0185816 A1* | 8/2008 | Riepler | ............ | A63C 5/07 |
| | | | | 156/182 |
| 2016/0108194 A1* | 4/2016 | Topolkaraev | ............ | C08J 5/04 |
| | | | | 521/134 |

FOREIGN PATENT DOCUMENTS

| | | | | |
|---|---|---|---|---|
| WO | WO 2017/152151 | | 9/2017 | |
| WO | WO-2017152151 A1 * | | 9/2017 | ............ A42B 3/064 |
| WO | WO-2018131923 A1 * | | 7/2018 | ............ A63C 5/04 |

OTHER PUBLICATIONS

Duncan et al. "Review of Auxetic Materials for Sports Applications: Expanding Options in 1-10 Comfort and Protection," Applied Sciences, Jun. 6, 2018, 8(6):941, 33 pages.

International Search Report and Written Opinion in International Appln. No. PCT/US2023/06092, mailed on Jul. 12, 2023, 10 pages.

Kelkar et al., "Cellular Auxetic Structures for Mechanical Metamaterials: A Review," Sensors, Jun. 2020, 20(11):3132, 26 pages.

* cited by examiner

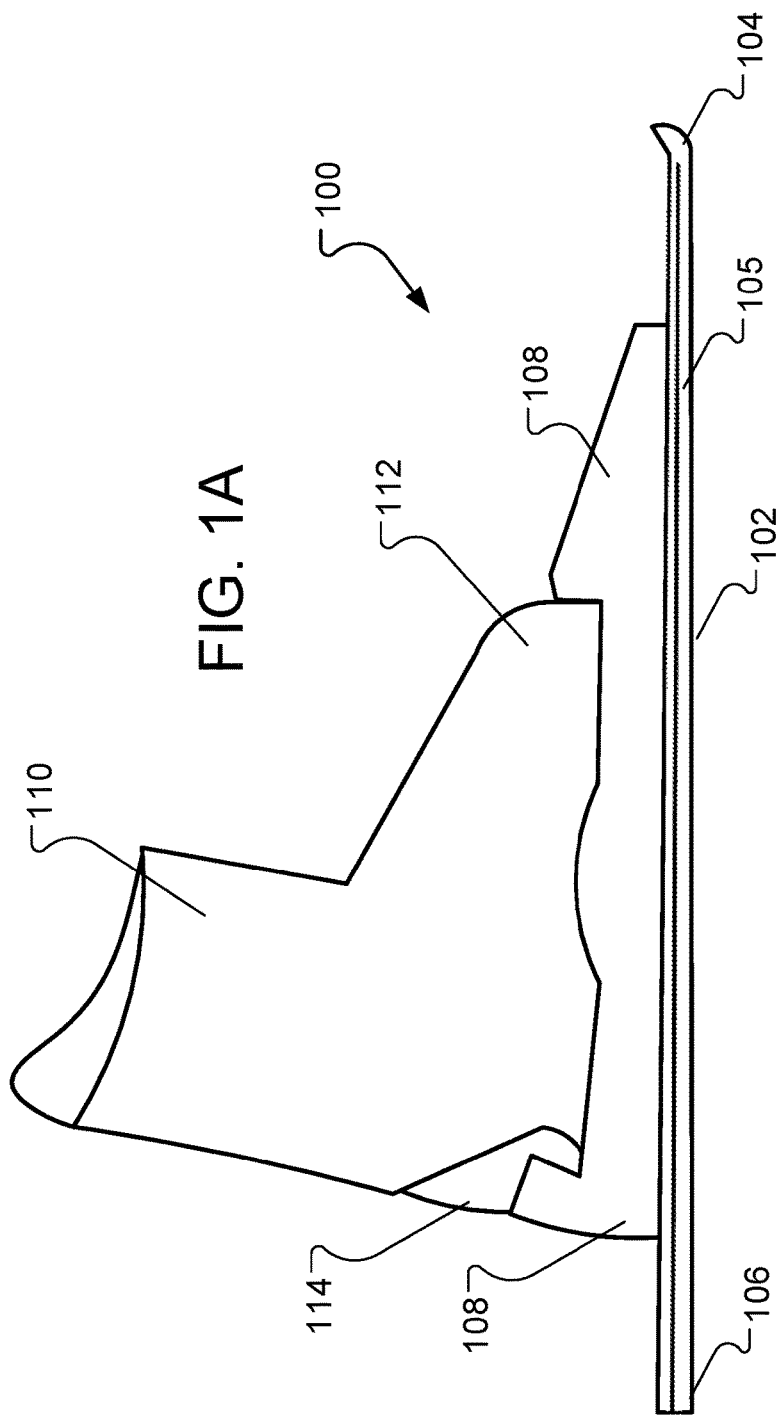

NEGATIVE POISSON'S RATIO MATERIALS FOR WINTER SPORTS EQUIPMENT

The present disclosure relates generally to materials for and construction of various types of winter sports equipment.

SUMMARY

We describe here winter sports equipment that is formed of materials having a negative Poisson's ratio ("NPR materials"). For instance, a ski can be formed of an NPR material. This composition facilitates efficient energy absorption by the ski, providing greater comfort for a user and providing impact resistance and durability. In some examples, skis are formed of composite materials that include both NPR materials and materials with positive Poisson's ratios ("PPR materials") to achieve desired performance characteristics.

In an aspect, a ski includes an elongated ski body having a bottom layer defining a bottom surface of the ski, a top layer defining a top surface of the ski, and a middle layer disposed between the bottom layer and the top layer, in which the middle layer includes a negative Poisson's ratio (NPR) foam material having a Poisson's ratio of between 0 and −1.

Embodiments can include one or any combination of two or more of the following features.

The NPR foam material includes an NPR polymer foam or an NPR metal foam, such as polytetrafluoroethylene (PTFE) or expanded polytetrafluoroethylene (e-PTFE), an NPR thermoplastic polymer foam, an NPR viscoelastic foam, or an NPR rubber foam.

The NPR foam material has a Poisson's ratio of between 0 and −0.8.

The NPR foam material is composed of a cellular structure having a characteristic dimension of between 0.1 μm and 3 mm.

The middle layer of the ski body includes a composite material including the NPR foam material and a positive Poisson's ratio (PPR) material.

The ski includes a binding disposed on the top surface of the ski body and attached to the ski body, in which the binding includes an NPR foam material. In some cases, the binding includes a composite material including the NPR foam material and a positive Poisson's ratio material.

The ski body includes edges disposed along a length of the ski body on each side of the ski body, in which each edge includes an NPR metal foam material.

In an aspect, a ski boot includes a rigid external shell defining an interior space, the shell including a rigid sole configured to couple to a binding affixed to a ski; a buckle attached to the external shell and configured to maintain the shell in a closed configuration; and an inner boot disposed within the interior space defined by the external shell, the inner boot configured to receive a foot of a wearer, in which the external shell, the internal boot, or both includes an NPR polymer foam material.

Embodiments can include one or any combination of two or more of the following features.

The buckle includes an NPR polymer foam material or an NPR metal foam material.

In an aspect, a method of making a ski includes forming a ski body, including forming a bottom layer to define a bottom surface of the ski, a middle layer disposed on the bottom layer, and a top layer disposed on the middle layer and defining a top surface of the ski, in which the middle layer includes an NPR foam material having a Poisson's ratio of between 0 and −1.

Embodiments can include one or any combination of two or more of the following features.

The method includes attaching a binding to the ski body such that the binding is secured to the top surface of the ski body, the binding being removably attachable to a boot.

The method includes forming the middle layer, including heating and compressing a positive Poisson's ratio (PPR) foam material to form the NPR foam material.

The method includes forming the middle layer from nano- or micro-structured PPR materials.

The method includes forming the middle layer using an additive manufacturing technique.

The method includes forming the middle layer of an NPR polymer foam or an NPR metal foam, such as an NPR thermoplastic polymer foam, an NPR viscoelastic foam, or an NPR rubber foam.

In an aspect, an ice skate includes a shoe including a sole and an upper, the sole and upper defining an interior space sized and dimensioned to receive a foot of a wearer; and a blade attached to the sole of the shoe, wherein the blade includes a negative Poisson's ratio (NPR) metal foam material having a Poisson's ratio of between 0 and −1.

Embodiments can include one or any combination of two or more of the following features.

The NPR metal foam includes one or more of aluminum, titanium, chrome, steel, carbon steel, or an alloy thereof.

The NPR foam material has a Poisson's ratio of between 0 and −0.8.

The NPR foam material is composed of a cellular structure having a characteristic dimension of between 0.1 μm and 3 mm.

The blade includes a composite material including the NPR metal foam material and a positive Poisson's ratio (PPR) material.

In an aspect, a snowboard includes a snowboard body having a bottom layer defining a bottom surface of the ski, a top layer defining a top surface of the ski, and a middle layer disposed between the bottom layer and the top layer, in which the middle layer includes a negative Poisson's ratio (NPR) foam material having a Poisson's ratio of between 0 and −1.

Embodiments can include one or any combination of two or more of the following features.

The NPR foam material includes an NPR polymer foam or an NPR metal foam, such as an NPR thermoplastic polymer foam, an NPR viscoelastic foam, or an NPR rubber foam.

The NPR foam material has a Poisson's ratio of between 0 and −0.8.

The NPR foam material is composed of a cellular structure having a characteristic dimension of between 0.1 μm and 3 mm.

The middle layer of the snowboard body includes a composite material including the NPR foam material and a positive Poisson's ratio (PPR) material.

The snowboard includes two bindings disposed on the top surface of the snowboard body and attached to the snowboard body, in which each binding includes an NPR foam material. In some cases, each binding includes a composite material including the NPR foam material and a positive Poisson's ratio material.

The snowboard body includes edges disposed along a length of the snowboard body on each side of the snowboard body, in which each edge includes an NPR metal foam material.

In an aspect, a snowmobile includes a body including a seat; a motor housed in the body; treads attached to a bottom side of the body, wherein the treads are configured to be driven by the motor to rotate relative to the seat; and a runner attached to the bottom side of the body, in which the runner includes a negative Poisson's ratio (NPR) foam material having a Poisson's ratio of between 0 and −1.

Embodiments can include one or any combination of two or more of the following features.

The NPR foam material includes an NPR polymer foam or an NPR metal foam. In some cases, the NPR foam material includes one or more of aluminum, titanium, chrome, steel, carbon steel, or an alloy thereof.

The NPR foam material has a Poisson's ratio of between 0 and −0.8.

The NPR foam material is composed of a cellular structure having a characteristic dimension of between 0.1 μm and 3 mm.

The runner includes a composite material including the NPR foam material and a positive Poisson's ratio (PPR) material.

The treads include an NPR foam material.

The treads include a composite material including the NPR foam material and a positive Poisson's ratio material.

Other embodiments are within the scope of the claims.

DESCRIPTION OF DRAWINGS

FIGS. 1A and 1B are illustrations of a ski.

DETAILED DESCRIPTION

Figure 1C:
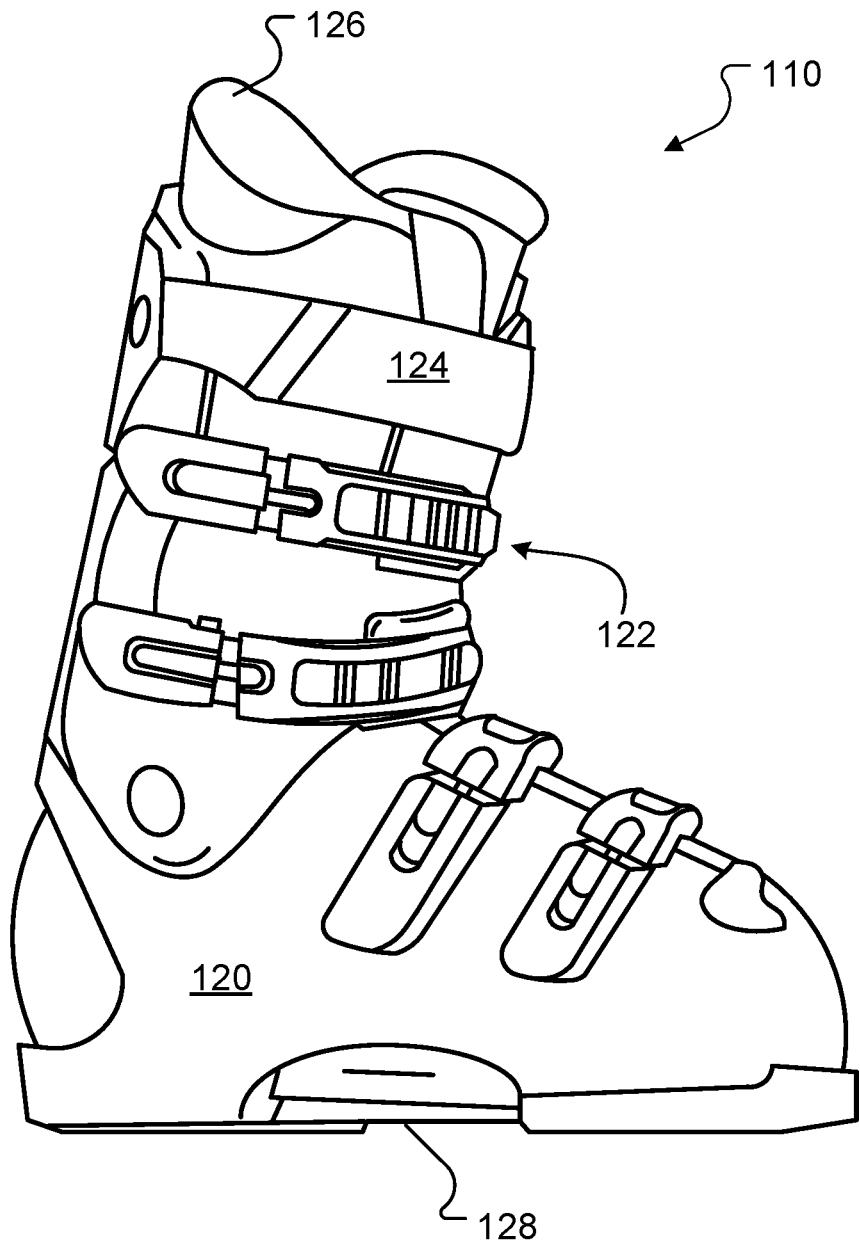
FIG. 1C is an illustration of a ski boot.

We describe here winter sports equipment that is formed of materials having a negative Poisson's ratio ("NPR materials"). For instance, a ski can be formed of an NPR material. This composition facilitates efficient energy absorption by the ski, providing comfort for a user, high performance of the skis, and impact resistance and durability. In some examples, skis are formed of composite materials that include both NPR materials and materials with positive Poisson's ratios ("PPR materials") to achieve desired performance characteristics.

FIG. 1A illustrates a ski 100 that includes an NPR material. The ski 100 includes an elongated ski body 102 that is generally flat, e.g., with a slight curvature (not shown) to facilitate turning. One or both ends 104, 106 of the ski body 102 can be curved. In the illustrated example, the front end 104 of the elongate member 102 is curved, and the back end 106 is not. In some examples, neither end of the ski body 102 is curved. The ski body 102 has a smooth bottom surface that allows a skier to glide across a snowy or icy surface (e.g., artificial snow, natural snow, etc.). The ski body 102 can include edges 105 disposed on the sides of the ski body 102 along all or a portion of the length of the length of the ski body 102 to allow the ski to cut into snow or ice.

The ski 100 also includes a binding 108 attached to the ski body 102 at its top surface to allow a ski boot 110 to be connected to the ski body 102. Generally, the binding 108 holds the boot 110 firmly to allow a skier to maneuver the ski 100. However, if certain force limits are exceeded, the binding 108 can release the boot 110 to minimize skier injury, such as in the case of a fall or impact. In the illustrated example, the binding 108 holds the boot 110 in place by contacting both the toe 112 and heel 114 of the boot 110. In some examples, the binding 108 holds only the toe 112 in place. In some examples, the binding 108 can hold the boot 110 in other fashions. For example, the binding 108 can be in the form of straps that span across the boot 110, adjustable clamps, or pins to keep the boot 110 from sliding forwards or backwards on the ski 100. Generally, bindings 108 are designed to allow the toe 112 and heel 114 of the boot 110 move within the bindings 108 to a small extent before releasing the boot 110. This provides a certain amount of shock absorption, and stops the skis 100 from being released inadvertently from the boot 110. Some bindings 108 are designed to let the boot move, e.g., about 5 mm, although this does vary between different manufacturers, models, and binding settings. Bindings 108 can dampen vibrations coming from the skis 100 during use (e.g., through the materials of the bindings 108, through the shape of the binding 108, through a damping system, etc.), thus providing a comfortable and lower-impact experience for the skier.

In some examples, the ski body 102 includes multiple layers. In the example of FIG. 1B, the ski body 102 includes three layers 116, 118, 120, with the top and bottom layers 116, 120 defining top and bottom surfaces, respectively, of the ski body 102, and the middle layer 118 disposed between the top and bottom layers 116, 120. In some examples, the outer layers 116, 120 are formed of the same material and the middle layer 118 formed of a different material than the layers 116, 120. In some examples, each of the three layers is formed of a different material than each other layer. In some examples, the ski body 102 can include more or fewer than three layers (e.g., one layer, two layers, four layers, etc.).

One or more parts of the ski 100, such as one or more layers of the ski body 102, a portion of the ski body 102 (e.g., the front end 104, the back end 106, etc.), the edges 105, or the bindings 108, include a material with a negative Poisson's ratio (referred to as an "NPR material" or an "auxetic material"), such as an NPR foam material, e.g., an NPR polymer foam or an NPR metal foam. In some examples, the NPR material is an NPR-PPR composite material. In some examples, the elongate member, the bindings, or both can have portions including an NPR material and portions including a PPR material. In an example, the central region of the ski body 102 includes an NPR material, while the ends 104, 106 are formed of a PPR material, e.g., polymers, polytetrafluoroethylene (PTFE), expanded polytetrafluoroethylene (ePTFE), or another suitable PPR material. In an example, the middle layer 118 of the ski body 102 is include an NPR material, such as an NPR polymer foam material, while the outer layers 116, 120 are formed of a PPR material. In an example, one or more regions or layers of the ski body 102 include an NPR material while the bindings 108 is formed of a PPR material, or vice versa. In an example, the edges 105 of the ski body 102 include an NPR material, such as an NPR metal foam material.

When multiple parts of a ski are formed of an NPR material, the same material is not necessarily used for all parts. In an example, the ski body 102 can include a first type of NPR foam material, and the bindings 108 can include a second, different type of NPR foam material. In an example, the middle layer 118 of the ski body 102 includes one type of NPR foam material and the outer layers 116, 120 include a second, different type of NPR foam material.

The NPR foam material used for the ski 100 can be an NPR polymer foam, such as a foam of polytetrafluoroethylene (PTFE), expanded polytetrafluoroethylene (ePTFE), or other suitable polymers. The NPR foam material used for the ski 100 can be an NPR polymer foam, such as an NPR thermoplastic polymer foam (e.g., a foam of polyester polyurethane or polyether polyurethane); an NPR viscoelastic elastomer foam; an NPR rubber foam (e.g., a foam of butadiene, polybutadiene, styrene-butadiene, or another suitable rubber); or another polymer foam. The NPR material can be an NPR metal foam or an NPR ceramic foam. The NPR metal foam, such as a foam of steel, carbon steel, chrome, titanium, aluminum, or other metals, or alloys thereof. In some examples, the NPR material is an NPR composite material that includes both an NPR material (e.g., an NPR foam material) and a PPR material. NPR-PPR composite materials are discussed further below. A foam is a multi-phase composite material in which one phase is gaseous and the one or more other phases are solid (e.g., polymeric, ceramic, or metal). Foams can be closed-cell foams, in which each gaseous cell is sealed by solid material; open-cell foams, in which the each cell communicates with the outside atmosphere; or mixed, in which some cells are closed and some cells are open.

In some examples, an interior portion of a part of the ski (e.g., the middle layer 118 of the ski body 102, or an interior portion of the binding 108) is formed of an NPR material or an NPR-PPR composite material, and a PPR material covers the interior portion (e.g., the outer layers 116, 120 are formed of a PPR material) such that the NPR material of the interior portion is not exposed to the environment, or is exposed to the environment only at the edges of the layered structure. This configuration can provide some of the benefits of an NPR material while also achieving benefits, such as durability, water resistance, or hardness, provided by the PPR material covering. In some examples, the interior portion of a part of the ski is a PPR material and an NPR material or an NPR-PPR composite material covers the PPR interior portion.

Referring to FIG. 1C, the ski boot 110 includes a rigid external shell 120 with buckles 122 and one or more straps 124, and a soft inner boot 126 disposed at least partially within the external shell. The buckles 122 and straps 124 are configured to hold the ski boot 110 in a closed configuration, e.g., when worn by a wearer. A rigid sole 128 at the bottom of the ski boot 110 is shaped to couple with the bindings 108 to attach the ski boot 110 to the ski body 102. The rigid external shell 120 In some examples, some or all of the elements of the ski boot 110 includes an NPR material, such as an NPR polymer foam material or an NPR metal foam material. For instance, the rigid external shell 120, the buckles 122, or both can include an NPR material, such as an NPR polymer foam material or an NPR metal foam material, to provide impact resistance and desired flex (e.g., stiffness) characteristics. The sole 128 can include an NPR material to provide a lightweight, sturdy connection to the binding 108 of the ski. The inner boot 126 can include an NPR material, such as an NPR polymer foam material, to provide warmth to a wearer and conformity to the wearer's foot.

The presence of NPR material in the ski 100 or ski boot 110 can contribute to target performance characteristics, such as strength, durability, stiffness, energy absorption, comfort, low density, etc. For example, NPR materials in skis absorb energy from impacts, e.g., from jumping or bumps, and the use of an NPR material in a ski can help to protect a user's feet, ankles, and knees from jarring impact. NPR materials have a lower density than PPR materials, e.g., than PPR materials of a similar composition or than PPR materials having similar mechanical properties, and skis including NPR materials can thus be lighter in weight than similar objects formed of PPR materials. For instance, NPR and PPR materials can be arranged in a ski to create a ski with a desired combination of stiffness and density, e.g., to obtain lightweight, high performance ski with a target stiffness.

An NPR material is a material that has a Poisson's ratio that is less than zero, such that when the material experiences a positive strain along one axis (e.g., when the material is stretched), the strain in the material along the two perpendicular axes is also positive (e.g., the material expands in cross-section). Conversely, when the material experiences a negative strain along one axis (e.g., when the material is compressed), the strain in the material along a perpendicular axis is also negative (e.g., the material compresses along the perpendicular axis). By contrast, a material with a positive Poisson's ratio (a "PPR material") has a Poisson's ratio that is greater than zero. When a PPR material experiences a positive strain along one axis (e.g., when the material is stretched), the strain in the material along the two perpendicular axes is negative (e.g., the material compresses in cross-section), and vice versa.

Figure 2:
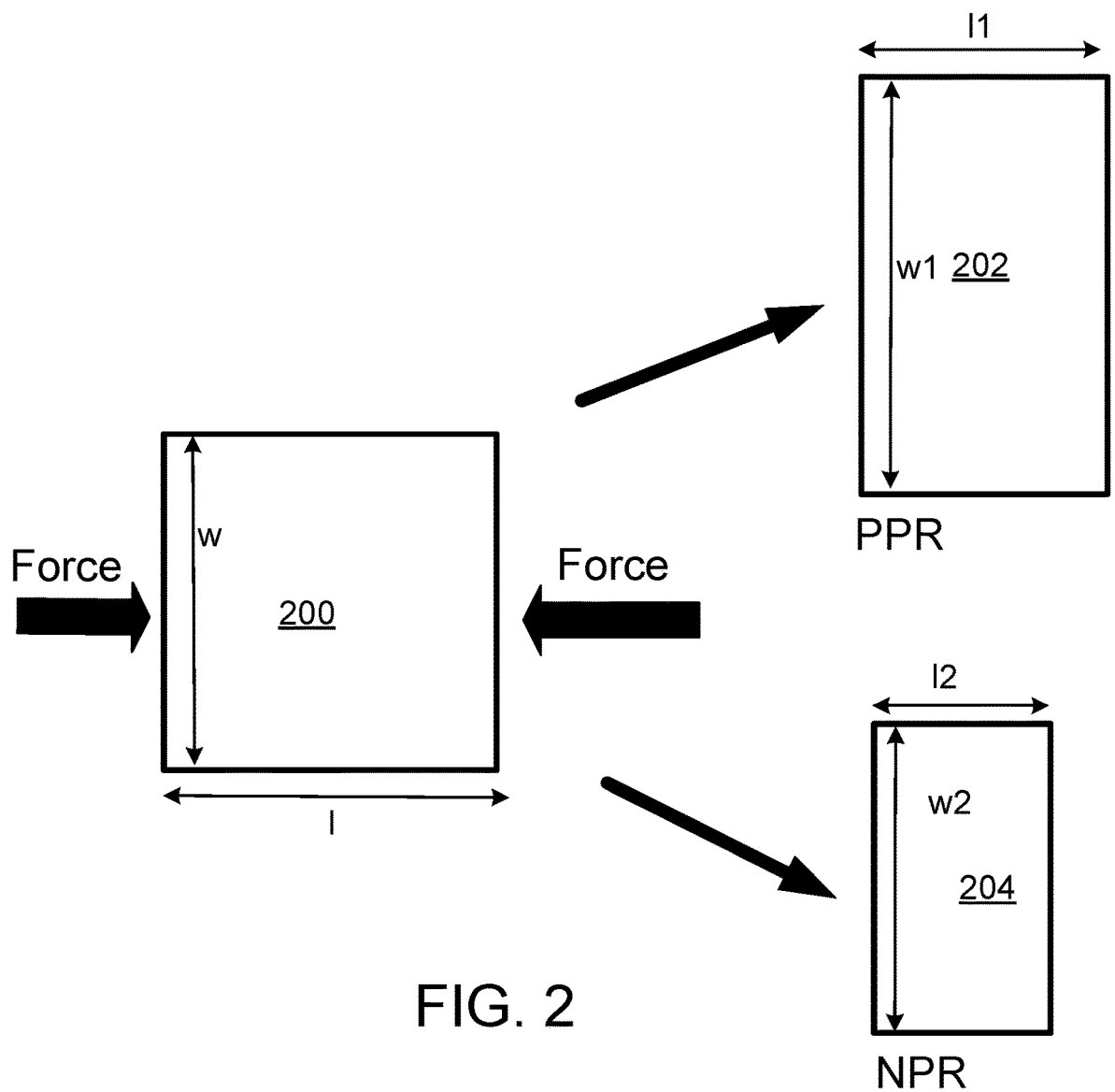
FIG. 2 is an illustration of materials with negative and positive Poisson's ratios.

Materials with negative and positive Poisson's ratios are illustrated in FIG. 2, which depicts a hypothetical two-dimensional block of material 200 with length l and width w.

If the hypothetical block of material 200 is a PPR material, when the block of material 200 is compressed along its width w, the material deforms into the shape shown as block 202. The width w1 of block 202 is less than the width w of block 200, and the length l1 of block 202 is greater than the length l of block 200: the material compresses along its width and expands along its length.

By contrast, if the hypothetical block of material 200 is an NPR material, when the block of material 200 is compressed along its width w, the material deforms into the shape shown as block 204. Both the width w2 and the length l2 of block 204 are less than the width w and length l, respectively, of block 200: the material compresses along both its width and its length.

NPR materials for winter sports equipment can be foams, such as polymeric foams, ceramic foams, metal foams, or combinations thereof. A foam is a multi-phase composite material in which one phase is gaseous and the one or more other phases are solid (e.g., polymeric, ceramic, or metal). Foams can be closed-cell foams, in which each gaseous cell is sealed by solid material; open-cell foams, in which the each cell communicates with the outside atmosphere; or mixed, in which some cells are closed and some cells are open.

An NPR foam can be polydisperse (e.g., the cells of the foam are not all of the same size) and disordered (e.g., the cells of the foam are randomly arranged, as opposed to being arranged in a regular lattice). An NPR foam can be a cellular structure having a characteristic dimension (e.g., the size of a representative cell, such as the width of the cell from one wall to the opposing wall) ranging from 0.1 μm to about 3 mm, e.g., about 0.1 μm, about 0.5 μm, about 1 μm, about 10 μm, about 50 μm, about 100 μm, about 500 μm, about 1 mm, about 2 mm, or about 3 mm.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

NPR-PPR composite materials are composites that include both regions of NPR material and regions of PPR material. NPR-PPR composite materials can be laminar composites, matrix composites (e.g., metal matrix composites, polymer matrix composites, or ceramic matrix composites), particulate reinforced composites, fiber reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase.

NPR materials can exhibit various desirable properties, including high shear modulus, effective energy absorption, and high toughness (e.g., high resistance to indentation, high fracture toughness), among others. The properties of NPR materials are such that a ski that includes an NPR material (an "NPR ski") undergoes a different (e.g., smaller) change in dimension when absorbing energy than a comparable ski formed of only PPR material (a "PPR ski").

The compressibility of a ski affects the elastic deformation (e.g., compression) experienced by the ski when it absorbs energy from impacts. A suitable amount of deformation enables a ski to help protect a user's feet, ankles, and knees (e.g., by reducing impact). A highly deformable ski will have a large amount of deformation when absorbing impact and may be inefficient or uncomfortable for skiing. To design a ski that is capable of efficiently absorbing impact, the material of the ski can be selected to balance rigidity and elasticity. NPR materials can be incorporated into the ski to provide the ski with a desired deformability (e.g., rigidity) and strength.

Figure 3:
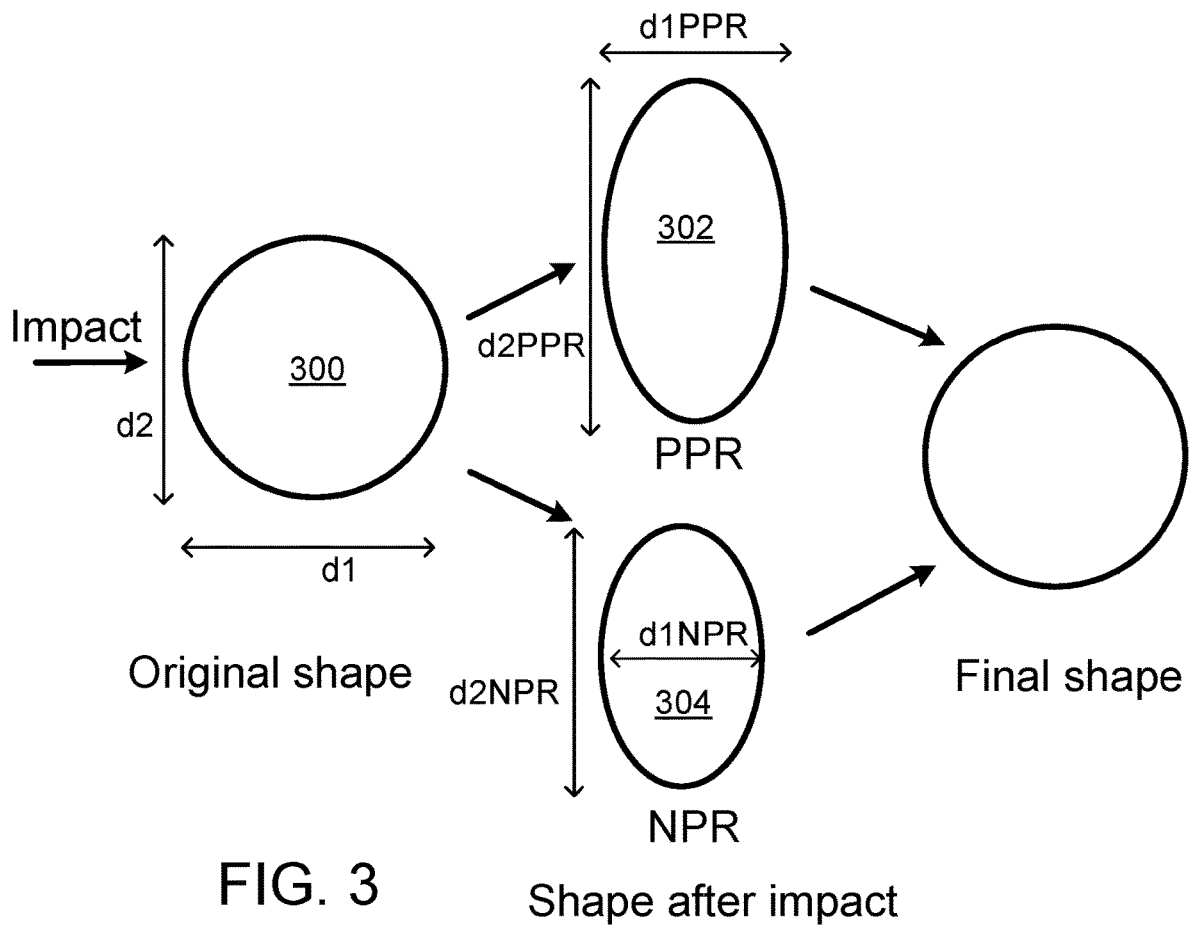
FIG. 3 is an illustration of balls with negative and positive Poisson's ratios.

FIG. 3 shows a schematic depiction of the change in diameter of a material 300 upon impact. Although the material 300 in FIG. 3 is shown as a rounded ball, a similar deformation occurs in materials of other shapes. Prior to impact, the material 300 has a diameter d1 in the direction of the impact and a diameter d2 in the direction perpendicular to the impact. If the material 300 is a PPR material, the material undergoes significant deformation (e.g., elastic deformation) into a shape 302, such that the diameter in the direction of the impact decreases to d1PPR and the diameter in the direction perpendicular to the impact increases to d2PPR. By contrast, if the material 300 is an NPR material, the material undergoes less extensive deformation into a shape 304. The diameter of the shape 304 in the direction of the impact decreases to d1NPR, which is approximately the same as d1PPR. However, the diameter of the shape 304 in the direction perpendicular to the impact also decrease, to d2NPR. The magnitude of the difference between d2 and d2NPR is less than the magnitude of the difference between d2 and d2PPR, meaning that the NPR material undergoes less deformation than the PPR ball.

Figure 4A:
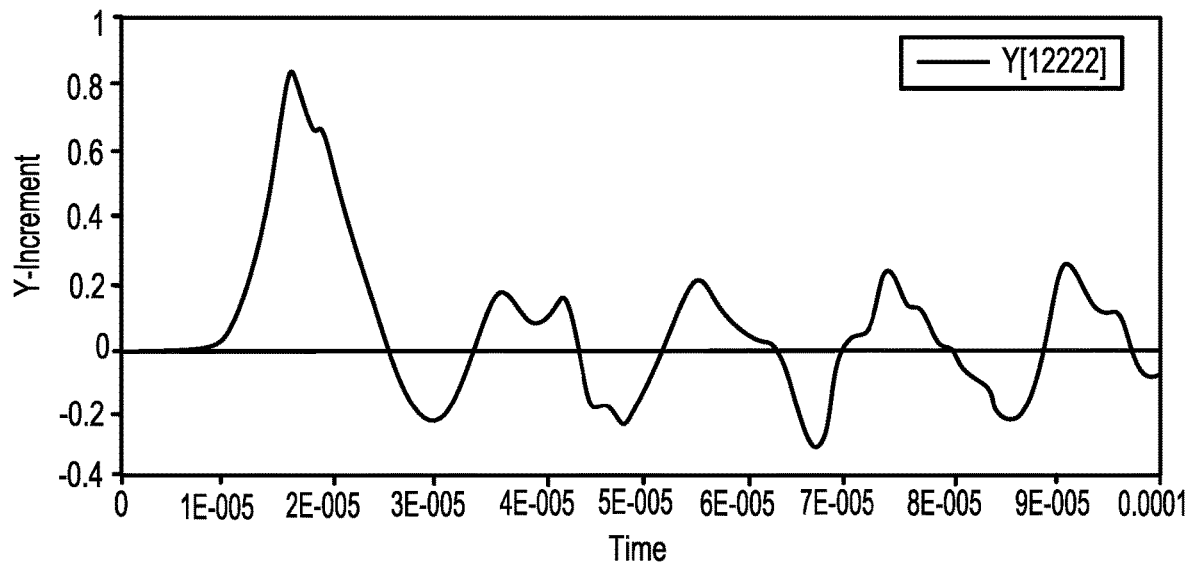
FIGS. 4A and 4B are plots of diameter versus time.
Figure 4B:
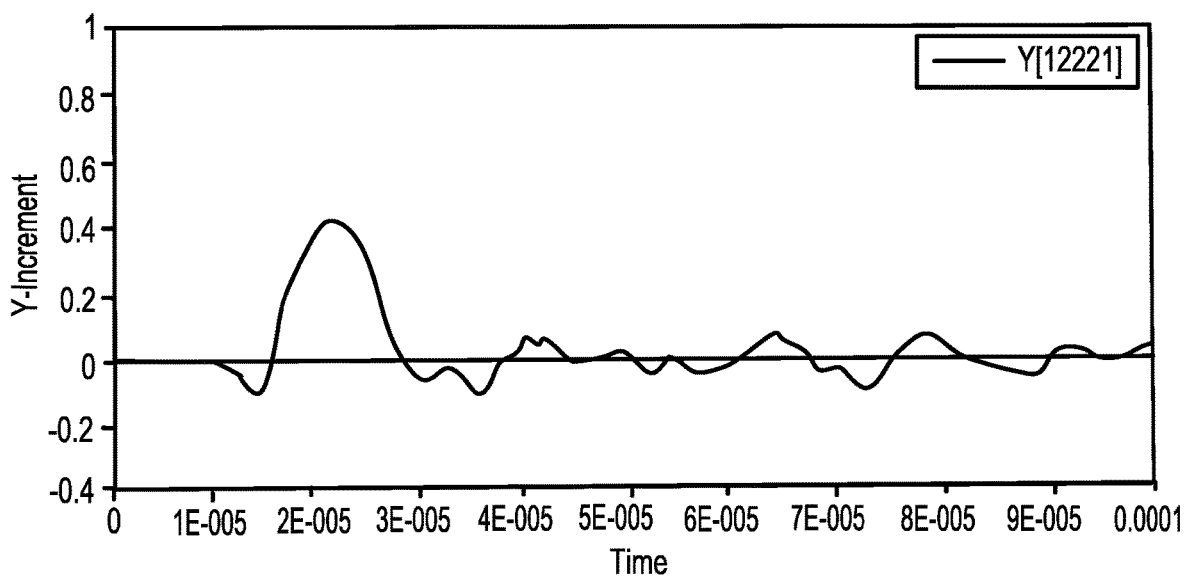

FIGS. 4A and 4B show plots of diameter versus time for a substantially spherical PPR material with a Poisson's ratio of 0.45 and an NPR material with a Poisson's ratio of −0.45, respectively, responsive to being struck with an equivalent force. In this example, the NPR material undergoes a smaller initial change in diameter than does the PPR material, and the oscillations in diameter are smaller in magnitude and dampen more quickly. Again, although FIGS. 4A and 4B are specific to substantially spherical materials, a similar behavior occurs in NPR and PPR materials of other shapes. The material of a piece of winter sports equipment can be selected to balance rigidity and elasticity.

Figure 5:
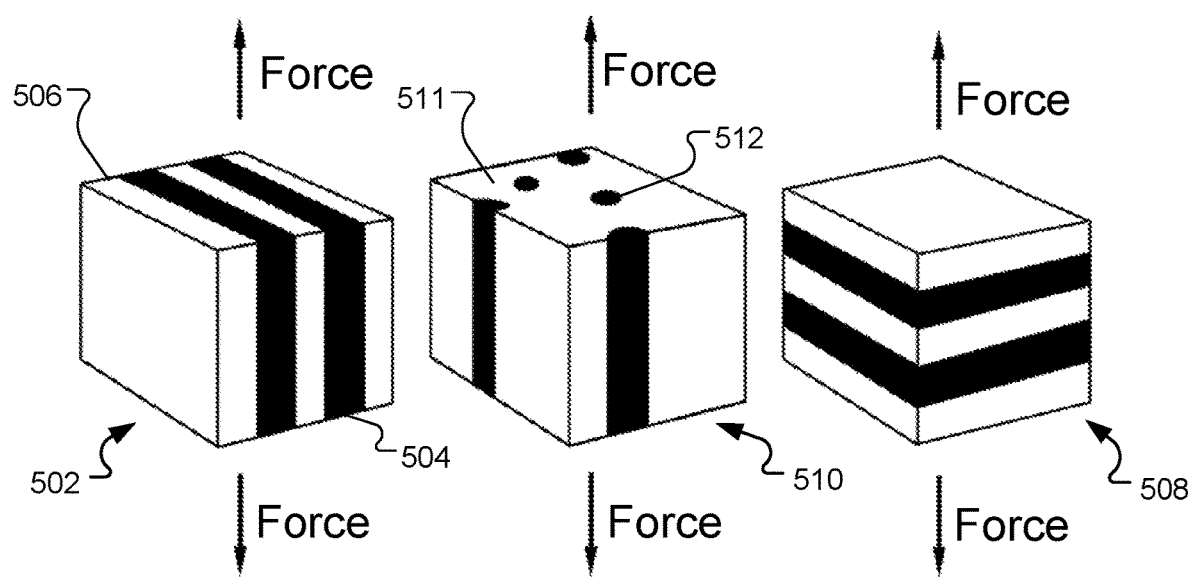
FIG. 5 is an illustration of composite materials.

FIG. 5 illustrates examples of NPR-PPR composite materials. An NPR-PPR composite material 502 is a laminar composite including alternating layers 504 of NPR material and layers 505 of PPR material. The layers 504, 506 are arranged in parallel to a force to be exerted on the composite material 502. Although the layers 504, 506 are shown as having equal width, in some examples, a laminar composite can have layers of different widths.

An NPR-PPR composite material 508 is a laminar composite including alternating layers of NPR material and PPR material, with the layers arranged perpendicular to a force to be exerted on the material 508. In some examples, the layers of a laminar composite are arranged at an angle to the expected force that is neither perpendicular nor parallel.

An NPR-PPR composite material 512 is a matrix composite including a matrix phase 511 of NPR material with a reinforcement phase 512 of PPR material. In the material 512, the reinforcement phase 512 includes fibers of the PPR material; in some examples, the reinforcement phase 512 can include particles or other configuration. In some examples, NPR-PPR composite materials can have a matrix phase of a PPR material with a reinforcement phase of an NPR material.

Figure 6:
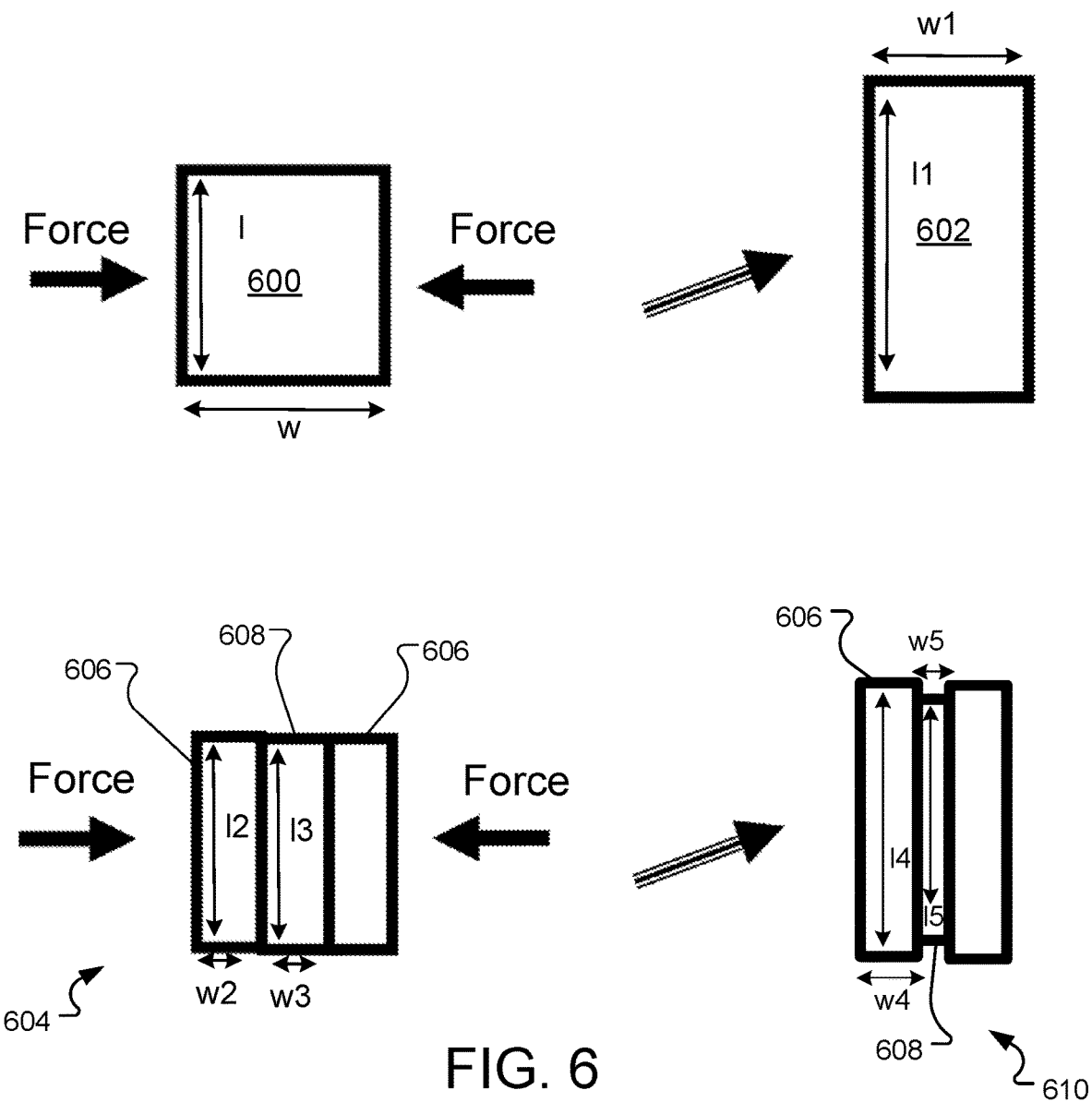
FIG. 6 is an illustration of a material with a positive Poisson's ratio and a composite material.

FIG. 6 illustrates the mechanical behavior of PPR and NPR/PPR composite materials. A hypothetical block 600 of PPR material, when compressed along its width w, deforms into a shape 602. The width w1 of the compressed block 602 is less than the width w of the uncompressed block 600, and the length l1 of the compressed block 602 is greater than the length l of the uncompressed block: the material compresses along the axis to which the compressive force is applied and expands along a perpendicular axis.

A block 604 of NPR/PPR composite material includes a region 608 of NPR material sandwiched between two regions 606 of PPR material. When the block 604 of composite material is compressed along its width, the material deforms into a shape 610. The PPR regions 606 compress along the axis of compression and expand along a perpendicular axis, e.g., as described above for the block 600 of PPR material, such that, e.g., the width w2 of a region 606 of uncompressed PPR material compresses to a smaller width w4 and the length l2 of the region 606 expands to a greater length l4. In contrast, the NPR region 608 compresses along both the axis of compression and along the perpendicular axis, such that, e.g., both the width w3 and length l3 of the uncompressed NPR region 608 are greater than the width w5 and length l5 of the compressed NPR region 608.

Figure 7A:
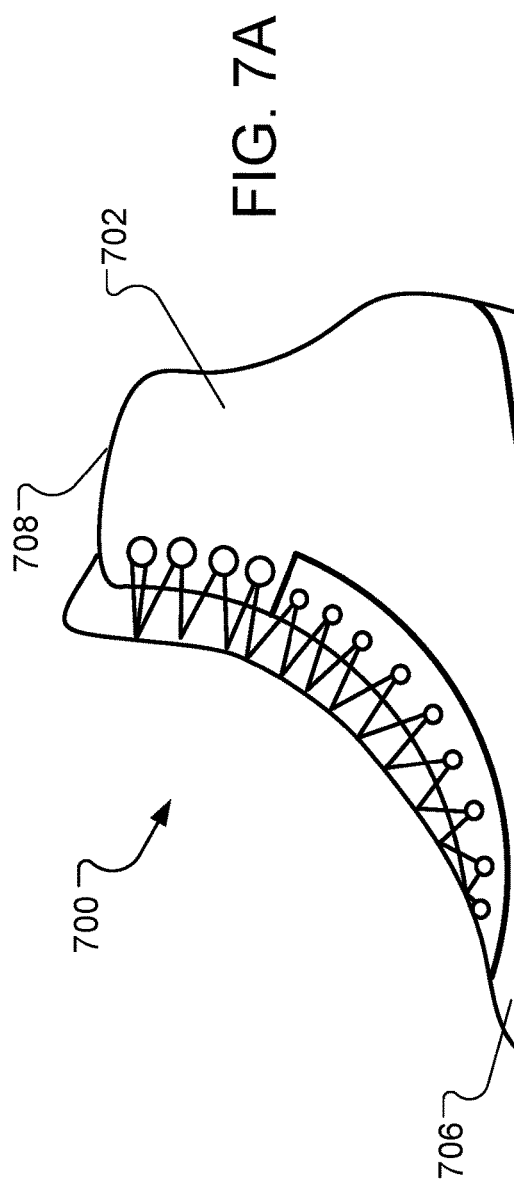
FIGS. 7A and 7B are illustrations of an ice skate.

NPR materials can also be used in winter sports equipment other than skis. For example, FIG. 7A illustrates an ice skate 700 that includes an NPR material. The ice skate 700 includes a shoe 702 that has a sole 704 and an upper 706 that together define an interior space for a skater's foot. An opening 708 in the upper 706 allows access to the interior space. The ice skate 700 also includes a blade 710 that is attached to the sole 704 of the ice skate. The blade 710 allows a skater to glide across an ice surface.

Figure 7B:
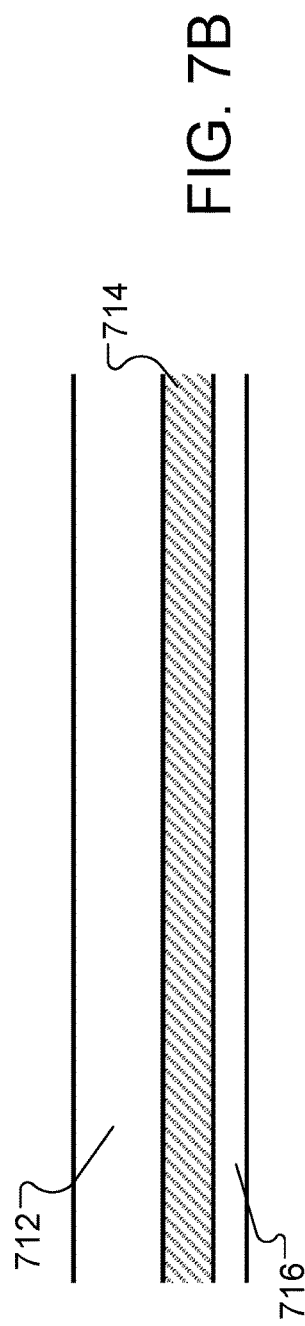

Referring to FIG. 7B, the blade 710 can include multiple layers 712, 714, 716, with the top and bottom layers 712, 716 defining top and bottom surfaces, respectively, of the blade 710, and the middle layer 714 disposed between the top and bottom layers 712, 716. The middle layer 714 can include a different material than the other layers 712, 716. In some examples, the blade 710 can include more or fewer than three layers (e.g., one layer, two layers, four layers, etc.).

One or more parts of the ice skate 700, such as the blade 710, the shoe 702, etc. can include an NPR material, such as an NPR foam material, e.g., an NPR polymer foam, an NPR metal foam, or an NPR-PPR composite material. In some examples, the blade, the shoe, or both can have portions including an NPR material and portions including an PPR material. In an example, the sole 704 includes an NPR material (e.g., an NPR foam material or an NPR-PPR composite material), while the upper 706 includes a PPR material, e.g., a polymer such as PTFE, ePTFE, or another suitable polymer, leather, satin, suede, canvas, or another suitable PPR material.

The NPR foam material used for the ice skate 700 can be an NPR polymer foam, such as a foam of PTFE, ePTFE, or another suitable polymer. The NPR polymer foam material used for the ice skate 700 can be, e.g., an NPR thermoplastic polymer foam (e.g., a foam of polyester polyurethane or polyether polyurethane); an NPR viscoelastic elastomer foam; an NPR rubber foam, such as a foam of butadiene, polybutadiene, styrene-butadiene, or other suitable rubbers; or another polymer foam. The NPR material can be an NPR metal foam or an NPR ceramic foam. The NPR metal foam, such as a foam of steel, carbon steel, chrome, titanium, aluminum, or other metals, or alloys thereof.

In some examples, the middle layer 714 of the blade 710 of the ice skate 700 includes an NPR material, and the outer layers 712, 716 are formed of a PPR material such that the NPR material of the middle layer 714 is not exposed to the environment. This configuration can provide some of the benefits of an NPR material while also achieving benefits, such as durability, water resistance, or hardness, provided by the PPR material on the exterior of the blade 710. In some examples, the middle layer 714 of the blade 710 is a PPR material and outer layers 712, 716 include an NPR material.

The presence of NPR material in the ice skate 700 can contribute to target performance characteristics, such as strength, durability, and energy absorption, comfort, low density, etc. For example, NPR materials in ice skates absorb energy from impacts, e.g., from jumping or bumps, thereby helping to protect a user's feet, ankles, and knees from jarring impact. NPR materials have a lower density than PPR materials, e.g., than PPR materials of a similar composition or than PPR materials having similar mechanical properties, and ice skates including NPR materials can thus be lighter in weight than similar objects formed of PPR materials.

Figure 8A:
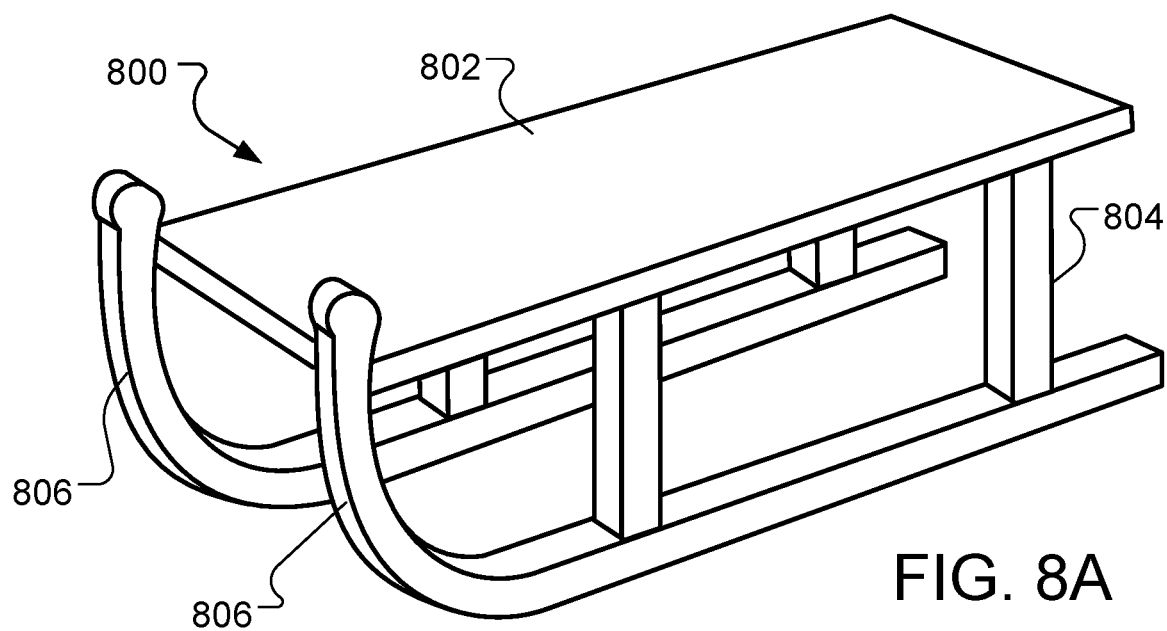
FIGS. 8A-C are illustrations of sleds.
Figure 8B:
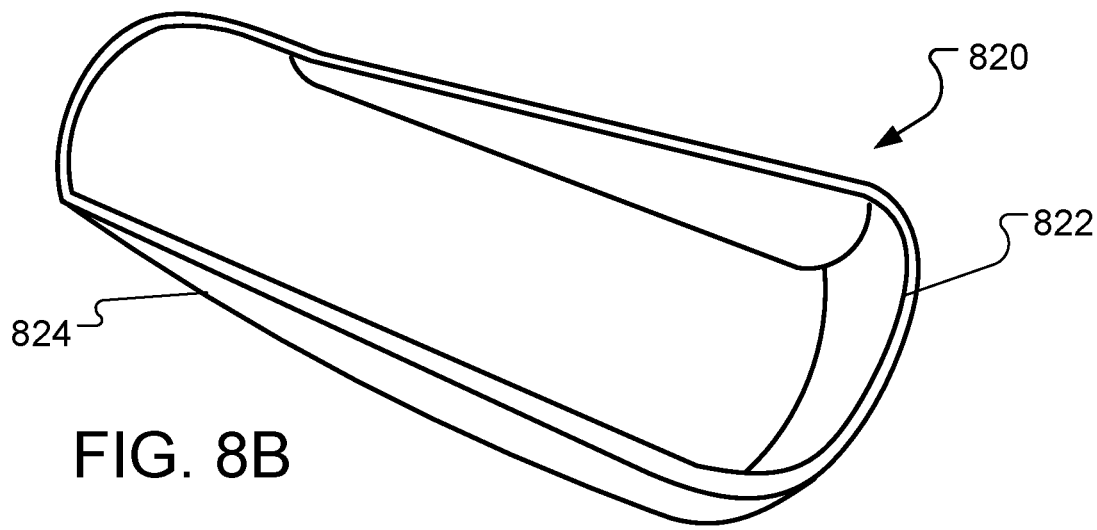
Figure 8C:
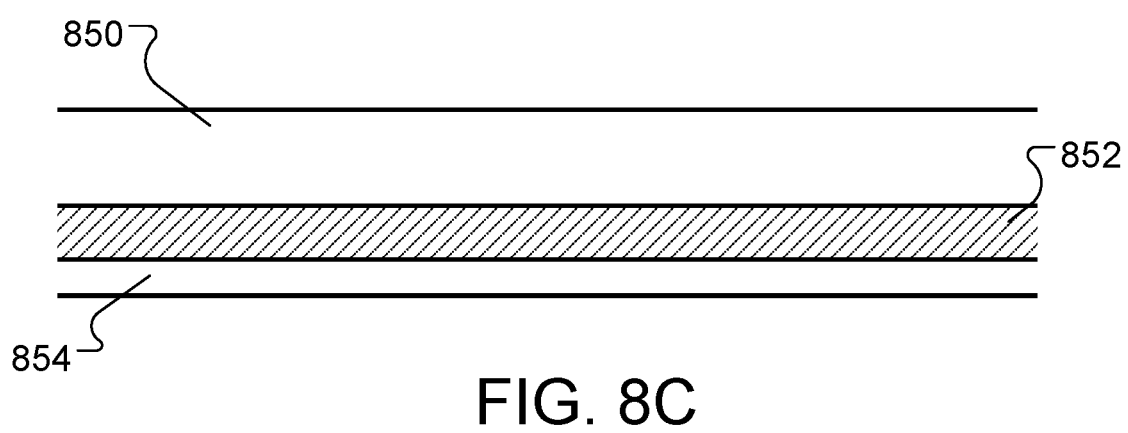

FIGS. 8A-8C illustrate sleds that include an NPR material. FIG. 8A illustrates a sled 800 that includes a seat 802, legs 804, and two runners 806 on the opposite side of the sled 800 from the seat 802. The runners 806 allow the sled to glide across snowy or icy surfaces. FIG. 8B illustrates a sled 820 that includes a seat 822 and a smooth bottom face 824 on the opposite side of the sled 820 as the seat 822, but without legs. In the illustrated example, the seat 822 is formed as a concave depression in the sled 820, however, in some examples, the seat 822 can have a different structure (e.g., as a flat surface, with a back rest, etc.).

A sled can include multiple layers. FIG. 8C shows a cross section of a portion of a sled (e.g., a cross section of the seat 802, legs 804, or runners 806 of the sled 800 or of the seat 822 or smooth bottom face of the sled 802) that includes three layers 850, 852, 854, with the top and bottom layers 850, 854 defining top and bottom surfaces, respectively, of the portion of the sled, and the middle layer 852 disposed between the top and bottom layers 850, 854. The middle layer 852 can include a different material than the other layers 850, 854. In some examples, the sled include more or fewer than three layers (e.g., one layer, two layers, four layers, etc.).

One or more parts of a sled, such as the seat, the runners, the legs, the smooth bottom face, etc. can include n NPR material, such as an NPR foam material, e.g., an NPR polymer foam, an NPR metal foam, or an NPR-PPR composite material. In some examples, the seat, runners, bottom face, or both can have portions including an NPR material and portions including a PPR material. In an example, a central region of the runners or bottom face includes an NPR material, while front and rear regions of the runners or bottom face include a PPR material, e.g., a polymer such as PTFE, ePTFE, or another suitable polymer, metal, wood, or another suitable PPR material.

The NPR foam material used for the sled can be an NPR polymer foam, such as a foam of PTFE, ePTFE, or other suitable polymer. The NPR polymer foam material used for the sled can be, e.g., an NPR thermoplastic polymer foam (e.g., a foam of polyester polyurethane or polyether polyurethane), an NPR viscoelastic elastomer foam; an NPR rubber foam, such as a foam of butadiene, polybutadiene, styrene-butadiene, or other suitable rubbers; or another polymer foam. The NPR material can be an NPR metal foam or an NPR ceramic foam. The NPR metal foam, such as a foam of steel, carbon steel, chrome, titanium, aluminum, or other metals, or alloys thereof.

In some examples, the middle layer 852 of a sled includes an NPR material, and the outer layers 850, 854 are formed of a PPR material such that the NPR material of the middle layer 852 is not exposed to the environment. This configuration can provide some of the benefits of an NPR material while also achieving benefits, such as durability, water resistance, or hardness, provided by the PPR material of the exterior layers. In some examples, the middle layer 852 of a sled component is a PPR material and the outer layers 850, 854 include an NPR material.

The presence of NPR material in the sled can contribute to target performance characteristics, such as strength, durability, and energy absorption, comfort, low density, etc. For example, NPR materials in a sled absorb energy from impacts, e.g., from jumps or bumps, thereby helping to protect a user's body. NPR materials have a lower density than PPR materials, e.g., than PPR materials of a similar composition or than PPR materials having similar mechanical properties, and sleds including NPR materials can thus be lighter in weight than similar objects formed of PPR materials.

Figure 9A:
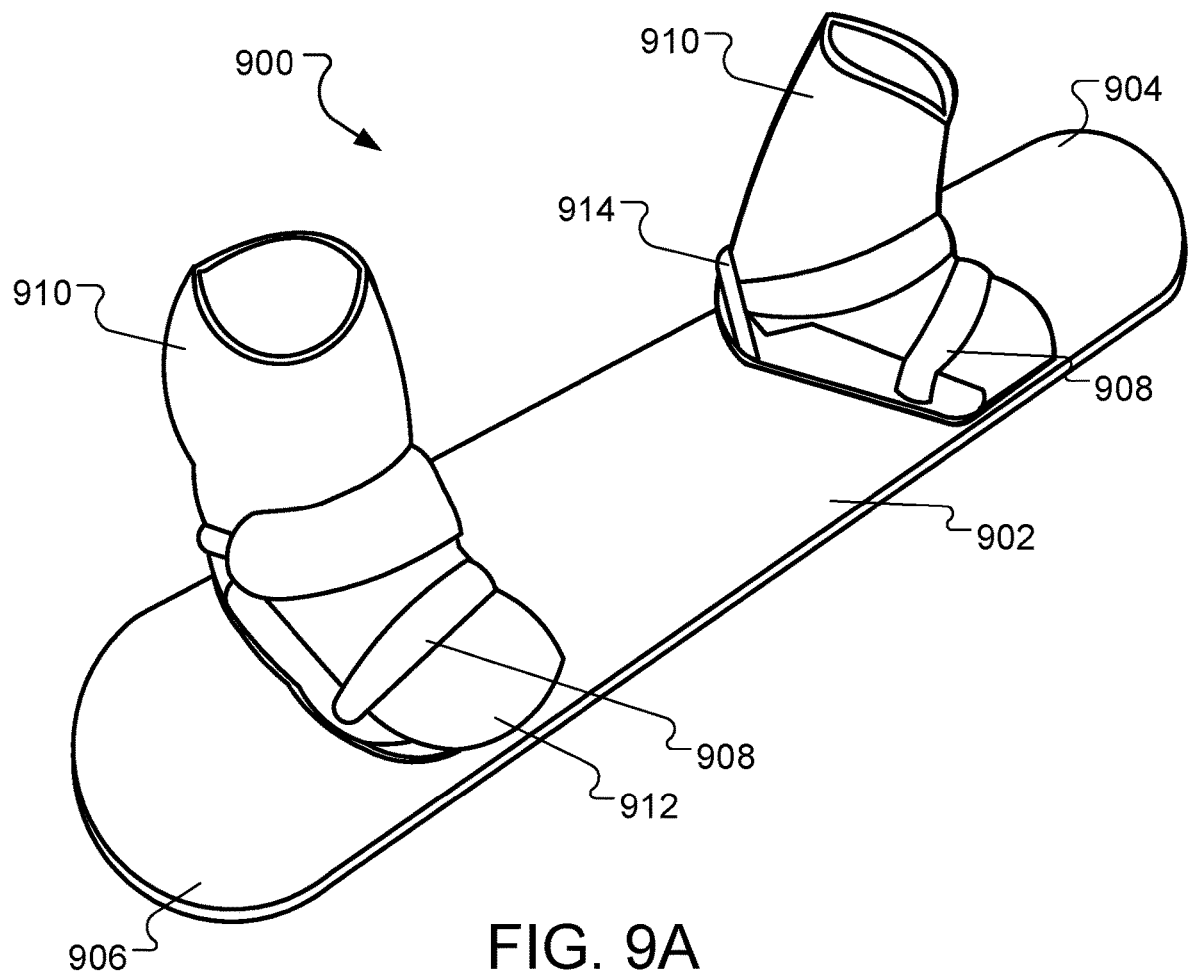
FIGS. 9A and 9B are illustrations of a snowboard.
Figure 9B:
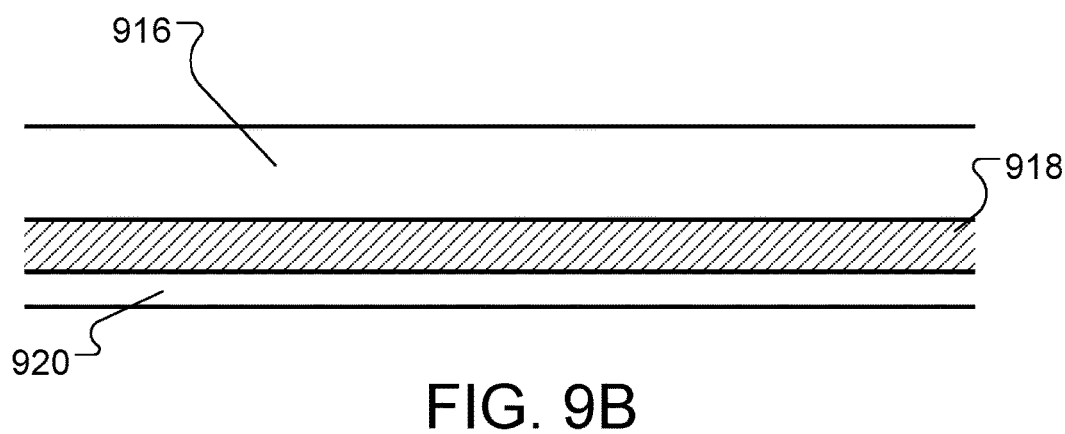

FIG. 9A illustrates a snowboard 900 that includes an NPR material. The snowboard 900 includes a snowboard body 902 that is generally flat, e.g., with a slight curvature. Both ends 904, 906 of the snowboard body 902 are curved. In some examples, only one end 904, 906 of the snowboard body 902 is curved, or neither end is curved. The snowboard body 902 provides a smooth surface that allows a snowboarder to glide across a snowy or icy surface. The snowboard body can include edges 905 disposed on the sides of the snowboard body 902 along all or a portion of the length of the length of the snowboard body 902 to allow the snowboard to cut into snow or ice.

The snowboard 900 also includes two bindings 908 attached to the snowboard body at its top surface. Each binding allows a respective boot 910 to be connected to the snowboard. Generally, the bindings 908 hold the boots 910 firmly to allow a snowboarder to maneuver the snowboard 900. In some examples, the binding 908 can be configured such that if certain force limits are exceeded, the bindings 908 can release the boot 910 to minimize snowboarder injury, such as in the case of a fall or impact. In the illustrated example, the bindings are straps that span across the boot 910. In some examples, the bindings 908 hold the boot 910 in other fashions. For example, the bindings 908 can contact the toe 912 and heel 914 of the boot 910 or can be in the form of adjustable clamps or pins to keep the boot 910 from sliding forwards or backwards on the ski 900. Bindings 908 can also dampen vibrations coming from the snowboard 900 during use (e.g., through the materials of the bindings 908, through the shape of the binding 908, through a damping system, etc.).

The snowboard body 902 can include multiple layers 916, 918, 920, with the top and bottom layers 916, 920 defining top and bottom surfaces, respectively, of the snowboard body 902, and the middle layer 918 disposed between the top and bottom layers 916, 920. The middle layer 918 can include a different material than the other layers 916, 920. In some examples, the snowboard body 902 can include more or fewer than three layers (e.g., one layer, two layers, four layers, etc.).

One or more parts of the snowboard 900, such as the snowboard body 902 or a portion thereof (e.g., the front end 904, the back end 906, etc.), the edges, or the bindings 908 include an NPR material, such as an NPR foam material, e.g., an NPR polymer foam or an NPR metal foam, or an NPR-PPR composite material. In some examples, the elongate member, the bindings, or both can have portions including an NPR material and portions including a PPR material. In an example, a central region the snowboard body 902 includes an NPR material, while the ends 904, 906 include a PPR material, e.g., a polymer such as PTFE, ePTFE, or another suitable polymer, or another suitable PPR material. In an example, the entirety of the snowboard body 902 includes an NPR material and the bindings 908 include a PPR material, or vice versa. In an example, the edges of the snowboard body include an NPR material, such as an NPR metal foam material.

When multiple snowboard components are formed of an NPR material, the same material is not necessarily used for all components. In an example, the snowboard body 902 can include a first type of NPR foam material, and the bindings 908 can include a second type of NPR foam material. In an example, some portions of the snowboard body 902 include one type of NPR material and other portions of the snowboard body 902 (e.g., the ends 904, 906) include a different type of NPR material.

The NPR foam material used for the snowboard 900 can be an NPR polymer foam, such as a foam of PTFE, ePTFE, or another suitable polymer. The NPR polymer foam can be, e.g., an NPR thermoplastic polymer foam (e.g., a foam of polyester polyurethane or polyether polyurethane); an NPR viscoelastic elastomer foam; an NPR rubber foam, such as a foam of butadiene, polybutadiene, styrene-butadiene, or other suitable rubbers; or another polymer foam. The NPR material can be an NPR metal foam or an NPR ceramic foam. The NPR metal foam, such as a foam of steel, carbon steel, chrome, titanium, aluminum, or other metals, or alloys thereof.

In some examples, the middle layer 908 of the snowboard 900 includes an NPR material, and the outer layers 906, 910 are formed of a PPR material such that the NPR material of the middle layer 908 is not exposed to the environment. This configuration can provide some of the benefits of an NPR material while also achieving benefits, such as durability, water resistance, or hardness, provided by the PPR material of the exterior layers. In some examples, the middle layer 908 is a PPR material and the outer layers 906, 910 include an NPR material.

The presence of NPR material in the snowboard 900 can contribute to target performance characteristics, such as strength, durability, and energy absorption, comfort, low density, etc. For example, NPR materials in snowboards absorb energy from impacts, e.g., from jumping or bumps, thereby helping to protect a user's feet, ankles, and knees. NPR materials have a lower density than PPR materials, e.g., than PPR materials of a similar composition or than PPR materials having similar mechanical properties, and snowboards including NPR materials can thus be lighter in weight than similar objects formed of PPR materials.

Figure 10A:
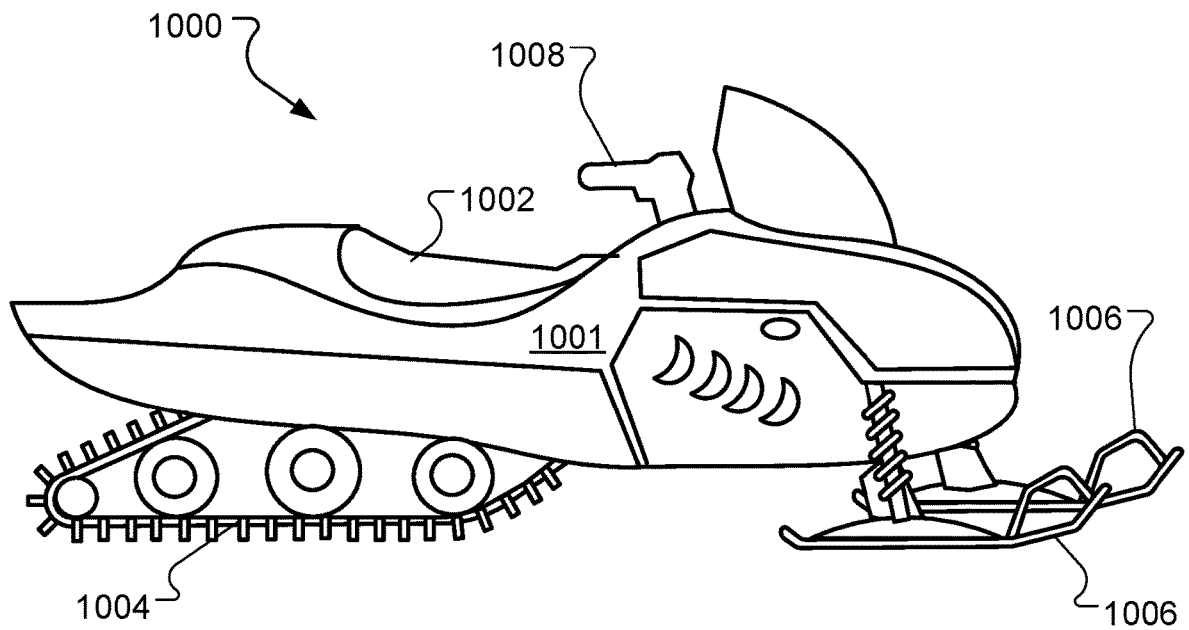
FIGS. 10A and 10B are illustrations of a snowmobile.
Figure 10B:
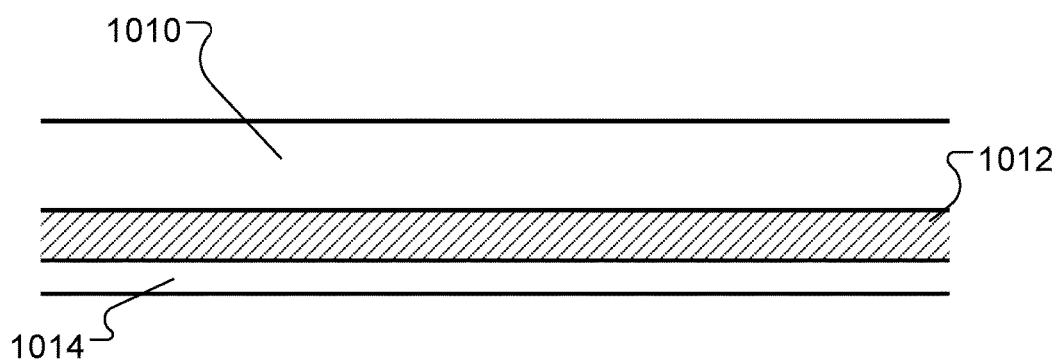

FIG. 10A illustrates a snowmobile 1000 that includes an NPR material. The snowmobile 1000 includes a body 1001 having a seat 1002 to accommodate a rider. The snowmobile 1000 also includes treads 1004 attached to a bottom surface of the body 1001. The treads 1004 rotate (e.g., about gears) to propel the snowmobile 1000 and can grip a snowy or icy surface to push or pull the snowmobile forwards or in reverse powered by a motor of the snowmobile 1000. In the example of FIG. 10A, the snowmobile 1000 has one set of wide treads 1004. In some examples examples, the snowmobile 1000 can have multiple sets of treads, which can increase the traction of the snowmobile on a slippery surface. The snowmobile 1000 also has two runners 1006 attached to the bottom surface of the body 1001. The treads 1004 and the runners 1006 are on the opposite side of the snowmobile from the seat 1002, such that a rider can sit on top of the snowmobile 1000. The runners 1006 allow the snowmobile 1000 to glide across a snowy or icy surface (e.g., artificial snow, natural snow, etc.) and also provide stability for the snowmobile 1000. In some examples, the snowmobile 1000 can include more or fewer than two runners (e.g., one smooth surface, three smooth surfaces, four smooth surfaces, etc.). The snowmobile 1000 also includes handlebars 1008 by which a rider can steer the snowmobile 1000.

The runners 1006 can include multiple layers 1010, 1012, 1014, with the top and bottom layers 1010, 1014 defining top and bottom surfaces, respectively, of the runner 1006, and the middle layer 1012 disposed between the top and bottom layers 1010, 1014. The middle layer 1012 can include a different material than the other layers 1010, 1014. In some examples, the runners 1006 can include more or fewer than three layers (e.g., one layer, two layers, four layers, etc.).

One or more parts of the snowmobile 1000, such as the runners 1006, the treads 1004, or the seat 1002 include an NPR material, such as an NPR foam material, e.g., an NPR polymer foam or an NPR metal foam, or an NPR-PPR composite material. In some examples, the smooth surface 1006, the treads 1004, or both can have portions including an NPR material and portions including a PPR material. In an example, the middle layer 1012 of the runners 1006 includes an NPR material, while the exterior layers 1010, 1014 of the runners 1006 include a PPR material, e.g., a polymer such as PTFE, ePTFE, or another suitable polymer, or another suitable PPR material.

When multiple snowmobile components are formed of an NPR material, the same material is not necessarily used for all components. In an example, the runners 1006 can include a first type of NPR foam material, and the treads 1004 can include a second type of NPR foam material. In an example, some portions of the runners 1006 include one type of NPR material and other portions of the runners 1006 include a different type of NPR material.

The NPR foam material used for the snowmobile 1000 can be an NPR polymer foam, such as a foam of PTFE, ePTFE, or another suitable polymer. The NPR polymer foam can be an NPR thermoplastic polymer foam (e.g., a foam of polyester polyurethane or polyether polyurethane); an NPR viscoelastic elastomer foam; an NPR rubber foam, such as a foam of butadiene, polybutadiene, styrene-butadiene, or other suitable rubbers; or another polymer foam. The NPR material can be an NPR metal foam or an NPR ceramic foam. The NPR metal foam, such as a foam of steel, carbon steel, chrome, titanium, aluminum, or other metals, or alloys thereof.

In some examples, the middle layer 1012 of a snowmobile component includes an NPR material, and the outer layers 1010, 1014 are formed of a PPR material such that the NPR material of the middle layer 1012 is not exposed to the environment. This configuration can provide some of the benefits of an NPR material while also achieving benefits, such as durability, water resistance, or hardness, provided by the PPR material of the exterior layers. In some examples, the middle layer 1012 is a PPR material and the outer layers 1010, 1014 include an NPR material.

The presence of NPR material in the snowmobile 1000 can contribute to target performance characteristics, such as strength, durability, and energy absorption, comfort, low density, etc. For example, NPR materials in snowmobile absorb energy from impacts, e.g., from jumping or bumps, thereby helping to protect a user's body. NPR materials have a lower density than PPR materials, e.g., than PPR materials of a similar composition or than PPR materials having similar mechanical properties, and snowmobiles including NPR materials can thus be lighter in weight than similar objects formed of PPR materials.

Figure 11:
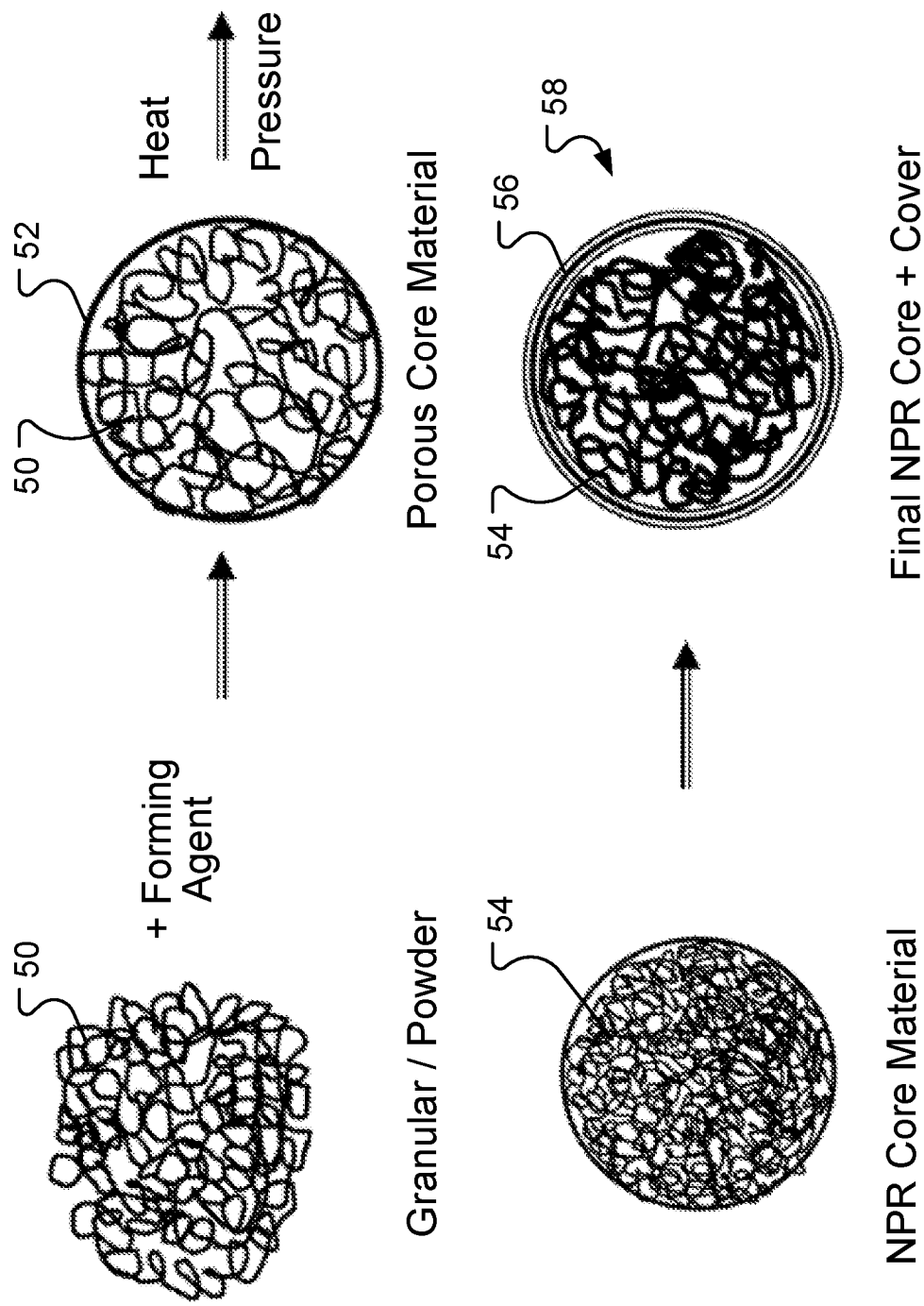
FIG. 11 is an illustration of a method of making an NPR material.

FIG. 11 illustrates an example method of making an object, such as piece of winter sport equipment such as a ski, ice skate, sled, snowmobile, or other object, formed of an NPR material. A granular or powdered material, such as a polymer material (e.g., a rubber) is mixed with a foaming agent to form a porous material 50. The porous material 50 is placed into a mold 52. Pressure is applied to compress the material 50 and the compressed material is heated to a temperature above its softening point. The material is then allowed to cool, resulting in an NPR foam 54. The NPR foam 54 is covered with an outer layer 56, such as a polymer layer, and heat and pressure is applied again to cure the final material into an object 58.

In some examples, a material can be formed into an NPR material by forming nanoscale or microscale structures, such as spheres or tubules, with the material.

Other methods can also be used to fabricate an object formed of an NPR material or an NPR-PPR composite material, such as a ski. For example, various additive manufacturing (e.g., 3D printing) techniques, such as stereolithography, selective laser sintering, or other appropriate additive manufacturing technique, can be implemented to fabricate an object formed of an NPR material or an NPR-PPR composite. In some examples, different components of the object are made by different techniques. For example, the bindings of a ski may be 3D printed while the elongate member not, or vice versa. Additive manufacturing techniques can enable seams to be eliminated.

Other embodiments are within the scope of the following claims.

What is claimed is:

1. A ski comprising:
an elongated ski body having a bottom layer defining a bottom surface of the ski, a top layer defining a top surface of the ski, and a middle layer disposed between the bottom layer and the top layer,
in which the middle layer comprises a negative Poisson's ratio (NPR) foam material having a Poisson's ratio of between 0 and −1; and
in which the ski body comprises edges disposed along a length of the ski body on each side of the ski body, in which each edge comprises an NPR metal foam material.

2. The ski of claim 1, in which the NPR foam material comprises an NPR polymer foam or an NPR metal foam.

3. The ski of claim 2, in which the NPR foam material comprises polytetrafluoroethylene (PTFE) or expanded polytetrafluoroethylene (e-PTFE).

4. The ski of claim 2, in which the NPR polymer foam comprises an NPR thermoplastic polymer foam, an NPR viscoelastic foam, or an NPR rubber foam.

5. The ski of claim 1, in which the NPR foam material has a Poisson's ratio of between 0 and −0.8.

6. The ski of claim 1, in which the NPR foam material is composed of a cellular structure having a characteristic dimension of between 0.1 µm and 3 mm.

7. The ski of claim 1, in which the middle layer of the ski body comprises a composite material comprising the NPR foam material and a positive Poisson's ratio (PPR) material.

8. The ski of claim 1, comprising a binding disposed on the top surface of the ski body and attached to the ski body, in which the binding comprises an NPR foam material.

9. The ski of claim 8, in which the binding comprises a composite material comprising the NPR foam material and a positive Poisson's ratio material.

* * * * *